US011220236B2

(12) United States Patent
Gray et al.

(10) Patent No.: US 11,220,236 B2
(45) Date of Patent: Jan. 11, 2022

(54) SEAT BELT RETRACTOR

(71) Applicant: Joyson Safety Systems Acquisition LLC, Auburn Hills, MI (US)

(72) Inventors: Mark Gray, Macomb, MI (US); Steve Reed, Lake Orion, MI (US)

(73) Assignee: JOYSON SAFETY SYSTEMS ACQUISITION LLC, Auburn Hills, MI (US)

( * ) Notice: Subject to any disclaimer, the term of this patent is extended or adjusted under 35 U.S.C. 154(b) by 221 days.

(21) Appl. No.: 16/372,188

(22) Filed: Apr. 1, 2019

(65) Prior Publication Data

US 2019/0322240 A1  Oct. 24, 2019

Related U.S. Application Data

(60) Provisional application No. 62/650,738, filed on Mar. 30, 2018.

(51) Int. Cl.
| | |
|---|---|
| *B60R 22/41* | (2006.01) |
| *B60R 22/36* | (2006.01) |
| *B60R 22/38* | (2006.01) |
| *B60R 22/08* | (2006.01) |
| *B60R 22/46* | (2006.01) |
| *B60R 22/44* | (2006.01) |

(52) U.S. Cl.
CPC .............. *B60R 22/41* (2013.01); *B60R 22/08* (2013.01); *B60R 22/36* (2013.01); *B60R 22/38* (2013.01); *B60R 22/46* (2013.01); *B60R 2022/4473* (2013.01); *B60R 2022/4666* (2013.01)

(58) Field of Classification Search
CPC ......... B60R 22/36; B60R 22/38; B60R 22/41; B60R 22/46
See application file for complete search history.

(56) References Cited

U.S. PATENT DOCUMENTS

| | | | |
|---|---|---|---|
| 4,014,479 A | 3/1977 | Nilsson et al. | |
| 5,505,400 A * | 4/1996 | Boelstler | B60R 22/415 |
| | | | 242/382.2 |
| 6,145,881 A | 11/2000 | Miller, III et al. | |
| 10,829,085 B2 * | 11/2020 | Elizondo | B60R 22/347 |
| 2003/0201357 A1 | 10/2003 | Koning et al. | |

(Continued)

OTHER PUBLICATIONS

International Search Report and Written Opinion dated Jul. 26, 2019 in International Application No. PCT/US2019/025243; filed Apr. 1, 2019.

*Primary Examiner* — Barry Gooden, Jr.
(74) *Attorney, Agent, or Firm* — Gordon Rees Scully Mansukhani, LLP

(57) ABSTRACT

A seat belt system for protecting an occupant of a vehicle, the system having seat belt webbing connected to a seat belt retractor that includes (a) a frame; (b) a spool with the seat belt webbing wound around, wherein the spool is rotatably mounted to the frame and configured to rotate in a webbing extraction direction and a webbing retraction direction; (c) an energy absorbing device for absorbing energy when the spool is rotated in the webbing extraction direction after an emergency event has occurred; and (d) a mechanism for selectively cancelling the operation of the energy absorbing device by preventing motion of the spool in the webbing extraction direction.

20 Claims, 5 Drawing Sheets

(56) References Cited

U.S. PATENT DOCUMENTS

| | | | |
|---|---|---|---|
| 2006/0267331 A1* | 11/2006 | Tanaka | B60R 22/46 |
| | | | 280/806 |
| 2010/0057303 A1* | 3/2010 | Odate | B60R 22/46 |
| | | | 701/45 |
| 2011/0140502 A1 | 6/2011 | Shiotani et al. | |
| 2012/0013111 A1 | 1/2012 | Nagata et al. | |
| 2018/0237246 A1* | 8/2018 | Osaki | B65H 18/10 |
| 2019/0217814 A1* | 7/2019 | Jaradi | B60R 22/41 |
| 2019/0232916 A1* | 8/2019 | Wang | B60R 22/4623 |
| 2019/0360787 A1* | 11/2019 | Gordon | B60R 21/26 |
| 2020/0086825 A1* | 3/2020 | Hall | B60R 22/341 |
| 2020/0094774 A1* | 3/2020 | Nagamine | B60R 22/28 |
| 2020/0276955 A1* | 9/2020 | Yanagawa | B60R 22/46 |
| 2020/0282948 A1* | 9/2020 | Yanagawa | B60R 22/46 |
| 2020/0298793 A1* | 9/2020 | Watanabe | B60R 22/4628 |
| 2020/0353892 A1* | 11/2020 | Wang | B60R 22/46 |
| 2020/0384946 A1* | 12/2020 | Tanaka | B60R 22/46 |

* cited by examiner

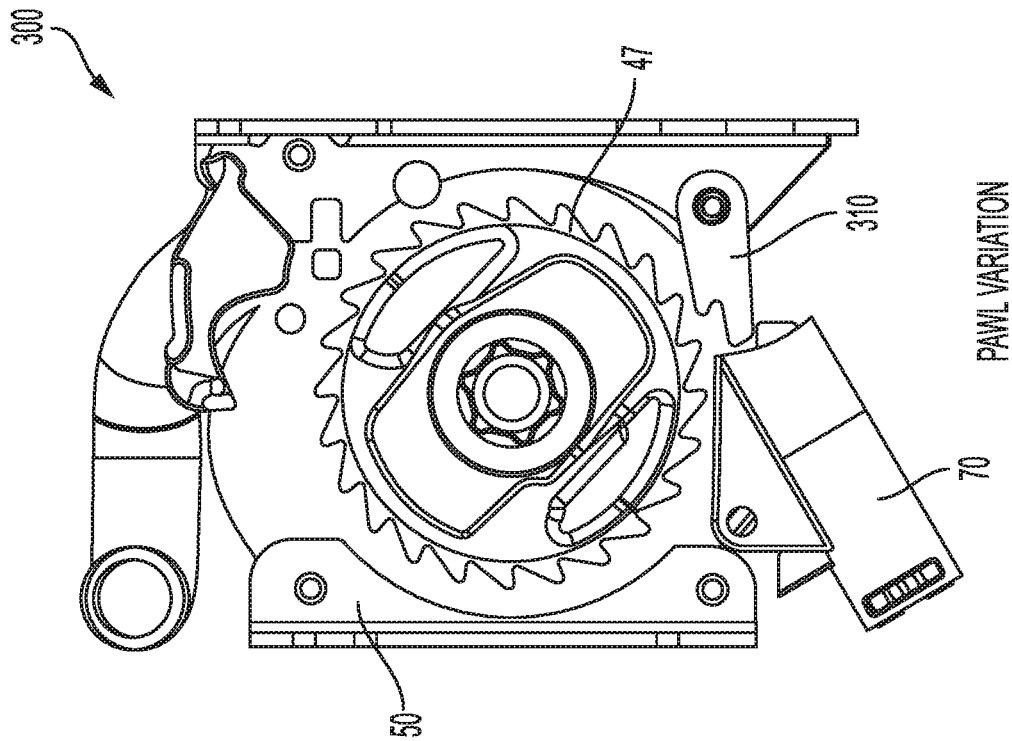
FIG. 8 PAWL VARIATION
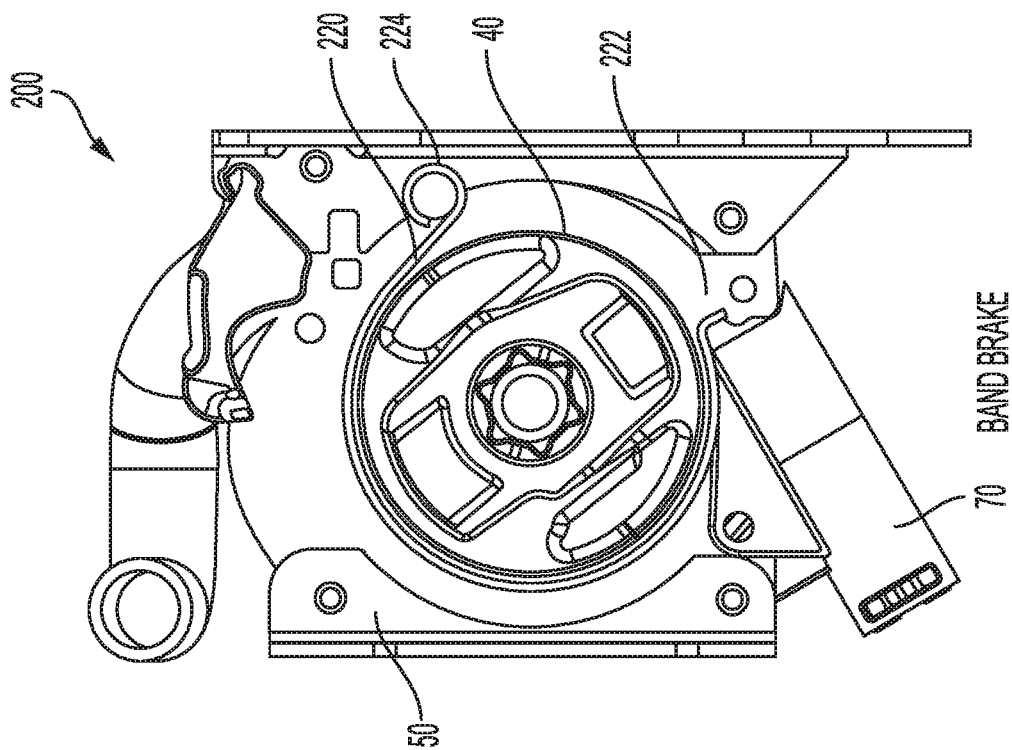
FIG. 7 BAND BRAKE

SEAT BELT RETRACTOR

RELATED APPLICATION

The present application claims priority to U.S. Provisional Patent Application 62/650,738 of the same title, filed Mar. 30, 2018, the entire disclosure of which is incorporated herein by reference in its entirety for all purposes.

BACKGROUND

The present application relates to seat belt systems.

The present application relates generally to the field of retractors for use in occupant restraint systems (e.g., seatbelt systems). These seat belt systems include a retracting or winding device to retract or wind up any excess amount of seat belt webbing that has been extended after the seat belt is latched. These seat belt retractors may also include a mechanism (e.g., a motor) for winding up the seat belt and for controlling the tension of the seat belt when the seat belt is being worn by the occupant of the vehicle. Thus, the motorized retractor may be configured to operate in both directions to wind and unwind the belt. The retractor system may also include a pre-tensioning device (e.g., a pyrotechnic driven device) for tensioning the seat belt.

The retractor may also include an energy absorbing mechanism. Current Energy Absorbing (EA) retractors are not capable of cancelling the EA function in certain situations where it would be beneficial for the EA function to be disabled such as in low offset impact events where the occupant should preferably be restrained from further movement. Certain existing retractors have stoppers that engage to stop the EA function after a predetermined number of spool rotations. These types of retractors are typically used in rear seat applications where no airbags are present. However, there exists a need for an improved rear seat retractor and a retractor including a suitable EA cancelling device or mechanism that could be used for front seat applications where many factors such as seat position, occupant size and the presence of airbags need to be accounted for.

SUMMARY

According to one embodiment disclosed herein, a seat belt retractor is provided that includes a spool for winding and unwinding a seat belt webbing. The retractor may include an optional pretensioner that provides for tensioning the seat belt webbing in the event of a crash involving the vehicle. The retractor also includes an energy absorbing (EA) function such as, for example, a torsion bar that allows for further rotation of the spool and unwinding of the seat belt after an emergency event (e.g., vehicle crash) has occurred. The retractor also includes a structure that provides for selectable cancelling of the EA function during the event.

The cancellation of the EA function is provided by locking the spool to ensure no further paying out of the webbing can occur. According to one disclosed embodiment, a wedge member is provided to contact both the spool and the retractor frame and thereby prevent any movement of the spool. The wedge member is driven into a position against both the spool and the frame (i.e., wedged between) where all movement of the spool is prevented. The wedge may be driven by a pyrotechnic device or another suitable method such as a solenoid, electromagnet or motor. In alternative embodiments, other spool locking devices could be used such as, for example, a pawl, cam, locking rollers, belt band or brake type system. The disclosed exemplary embodiments are representative of a retractor system that offers the ability to selectively cancel the energy absorbing function of a retractor during or just prior to a crash event where the EA function is not required for occupant safety.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages will become apparent from the following description, appended claims, and the accompanying exemplary embodiments shown in the drawings, which are briefly described below.

FIG. 7 is a side view of a retractor showing alternative embodiment of an EA cancelling device.

FIG. 8 is a side view of a retractor showing another alternative embodiment of an EA cancelling device.

DETAILED DESCRIPTION

Disclosed herein are seat belt retractor mechanisms that are configured to include energy management devices that absorb energy. The energy absorbing (EA) devices are configured to limit the chest deflection (or displacement) and compression of the occupant.

Figure 1:
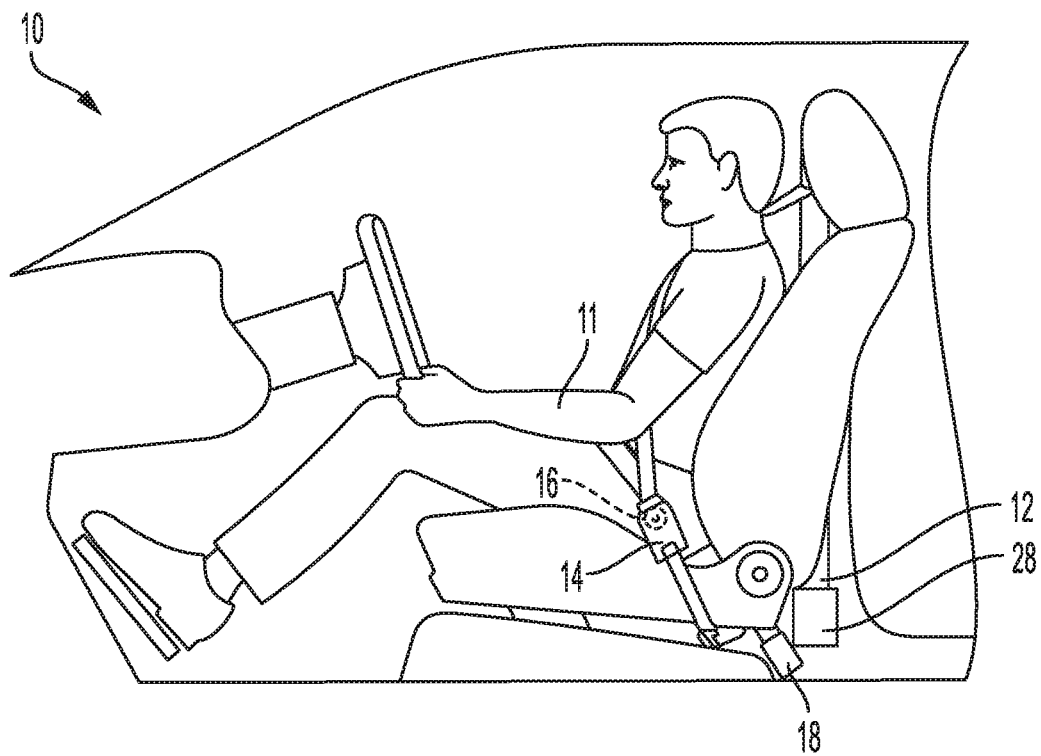
FIG. 1 is a side view of a vehicle showing an occupant restraint system in the form of a seatbelt assembly having a retractor according to an exemplary embodiment.

FIG. 1 discloses an exemplary seat belt system 10. The seat belt system 10 is used within a vehicle to help restrain the movement of an occupant 11 during a sudden acceleration, typically resulting from a dynamic impact event of the vehicle. The term acceleration refers to the absolute value of the acceleration that the vehicle experiences, whether negative (e.g., deceleration) or positive. The seat belt system 10 includes a webbing or belt 12, a buckle 14, a tongue member 16 to engage the buckle 14, an anchor member 18, and a retractor 20. During a dynamic impact event of the vehicle, the retractor 20 may lock the webbing from extracting or unwinding, which restricts movement of the occupant. The seat belt system 10 may include one or more sensors (not shown) configured to detect a sudden acceleration of the vehicle. The acceleration sensor(s) is configured to send a signal to a controller for the retractor 20. The controller may be configured to activate the retractor as appropriate depending on whether the sensor detects a low or high acceleration event.

Figure 2:
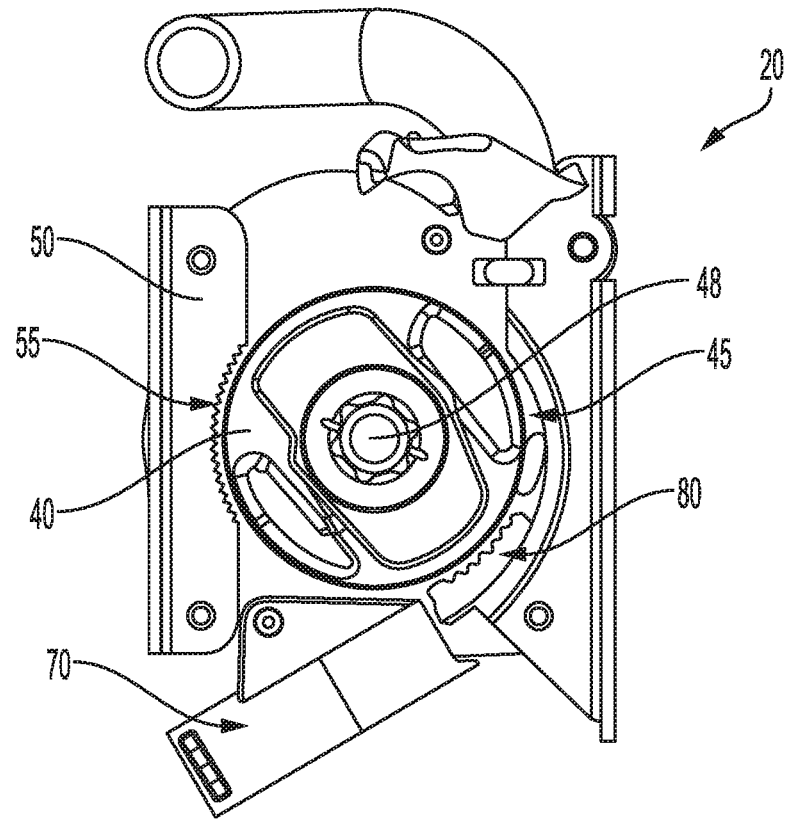
FIG. 2 is a side view of a seat belt retractor including a device or structure for cancelling the energy absorbing function of the retractor.
Figure 3:
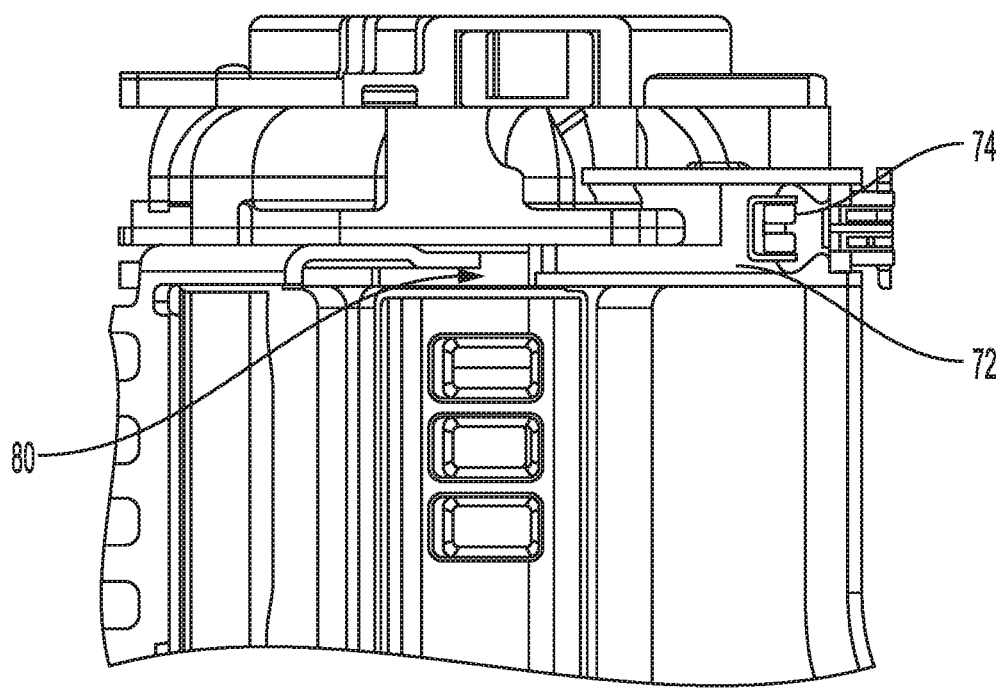
FIG. 3 is a partial top view of the retractor of FIG. 2.
Figure 4:
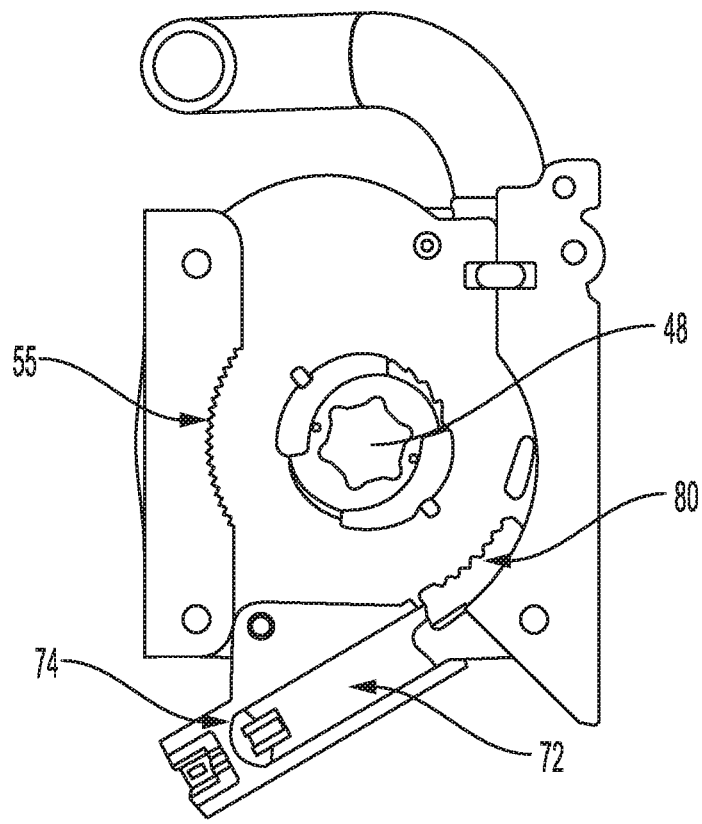
FIG. 4 is a cutaway side view of the retractor of FIG. 2 prior to activation of the EA cancelling device.

As shown in FIG. 2, a seat belt retractor 20 may include a retractor frame 50 that supports a spool 40 that carries the belt webbing 12. The retractor 20 may include an energy absorbing device (e.g., a torsion bar 48) that is connected to the spool 40 at a first end and may be located along the rotational axis of the spool. When a crash event occurs and the retractor is triggered, an opposite, second end of the torsion bar 48 may be locked by a locking device. At the same time, the first end of the torsion bar 48 remains free to rotate with the spool 40. Thus, when the spool 40 rotates due to the force of the occupant against the belt webbing 12, the torsion bar 48 twists to absorb energy. The energy absorbing (EA) function of the retractor 20 continues due to the twisting of the torsion bar 48 until the torsion bar 48 hits its maximum deformation or until the spool 40 is locked to prevent further rotation as described herein.

As described further below, the spool 40 may be locked to prevent further rotation by providing an EA cancelling device or structure. As shown in FIG. 2, the EA cancelling device may include a wedge shaped locking member 80 and an activation device 70. In the exemplary embodiment shown in FIG. 2, the wedge 80 includes teeth for engaging with the spool 40. The activation device 70 may be a pyrotechnic device that includes a gas generator 74 (for example, a micro gas generator (MGG) and a piston 72. The spool 40 may include an outwardly protracting flange 45 that is engaged by the wedge 80 when the EA cancelling device is activated. The retractor frame 50 may include a portion containing teeth 55 that is shaped and positioned to engage with the spool flange 45.

Figure 6:
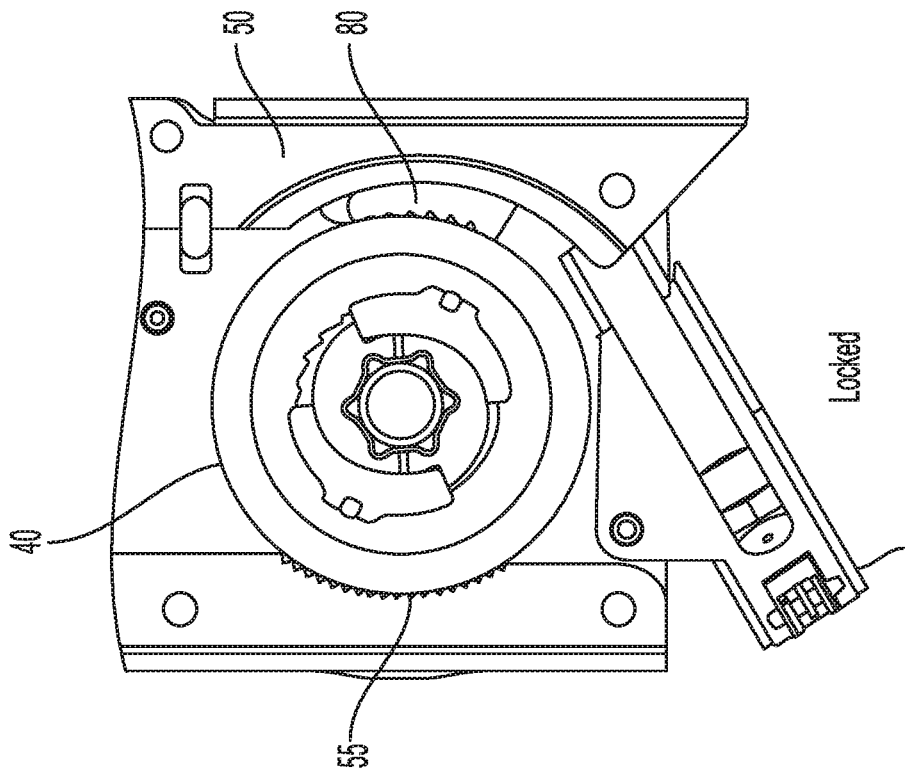
FIG. 6 is a side view of the retractor of FIG. 2 with the retractor spool in a locked condition.
Figure 5:
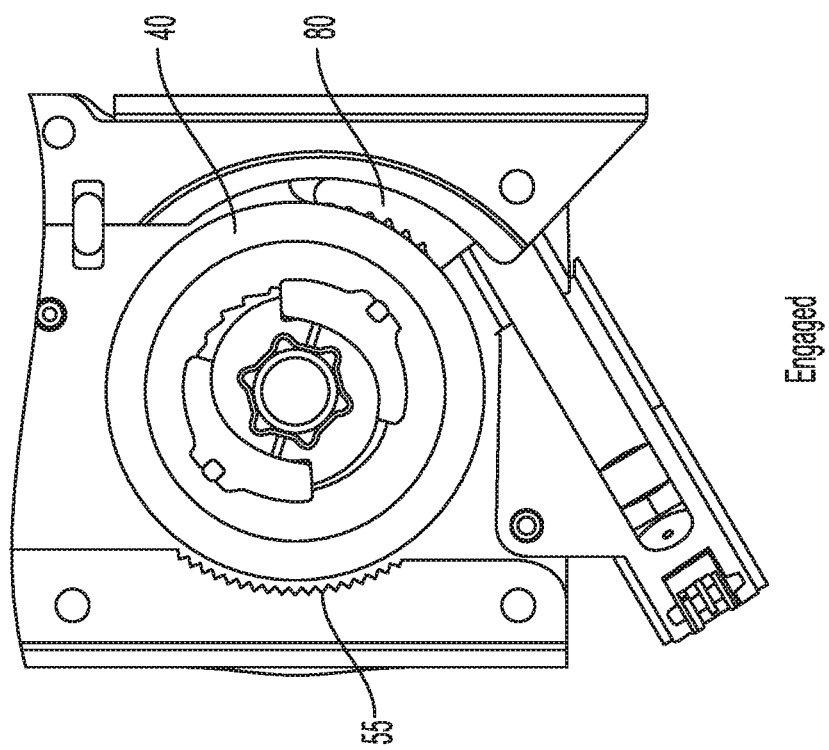
FIG. 5 is a side view of the retractor of FIG. 2 after activation of the EA cancelling device but prior to locking of a spool of the retractor.

During operation, when it is desirable to selectively cancel the EA function, the activation device 70 is triggered causing the gas generator 74 to activate. The piston 72 is driven into the wedge 80 causing the wedge 80 and its associated teeth to engage the spool flange 45 (see FIG. 5). As the spool 40 continues to rotate due to the force of the occupant on the webbing 12, the wedge 80 is drawn along with the spool 40 further wedging in a position between the spool flange 45 and the retractor frame 50. As the wedge 80 is drawing into a deeper position in the gap between the spool 40 and the retractor frame 50, the spool 40 becomes displaced in a direction opposite of the wedge 80. As a result, as shown in FIG. 6, the spool flange 45 makes contact with the retractor frame 50. In particular, the flange 45 contacts the toothed portion 55 of the retractor frame and is locked in position thereby preventing further rotation of the spool 40 and ceasing all energy absorption through the twisting for the torsion bar 48.

FIG. 7 discloses an alternative embodiment of a seat belt retractor 200. The retractor 200 includes an EA cancelling device or structure that includes the activation device 70 and a band brake 220. The band brake 220 comprises a flexible band that surrounds a large portion of a flange of the spool. As shown in FIG. 7, the band 220 surrounds more than 50 percent of the circumference of the spool. The band 220 may be fixed to the retractor frame 50 at one end 224. The second end 222 of the band 220 is aligned proximate to the piston 72 of the activation device 70. When the activation device 70 is triggered or initiated, the piston 72 drives the second end 222 of the band 200 to cause the band to cinch tightly around the spool 40, or spool flange 45, thereby causing the rotation of the spool 40 to be stopped. As a result, further energy absorption (e.g., via twisting for the torsion bar 48) is prevented.

Figure 9:
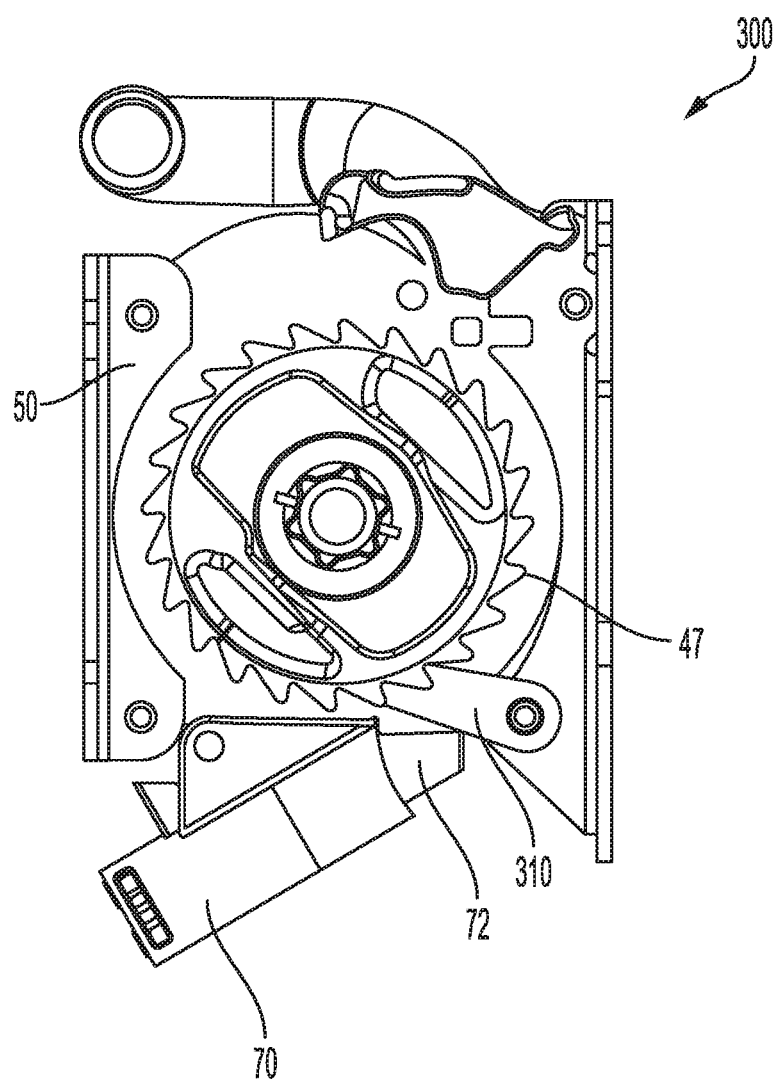
FIG. 9 is a side view of the retractor of FIG. 8 with the retractor spool in a locked condition.

FIGS. 8 and 9 depict another alternative embodiment of a retractor 300 with an EA cancelling mechanism. The retractor 300 includes the activation device 70 and a pawl 310, which is pivotally mounted on the retractor frame 50. The pawl 310 is positioned to engage with the piston 72 of the activation device 70. When the activation device is triggered or initiated, the piston 72 drives the pawl 310 to rotate toward the spool 40. As shown in FIG. 9, the pawl 310 engages with the spool or the spool flange which may include teeth 47 for engaging with corresponding one or more teeth on the pawl. After the pawl 310 is engaged with the spool 40, further rotation of the spool 40 is stopped. As a result, further energy absorption (e.g., via twisting for the torsion bar 48) is prevented.

As mentioned above, the retractor further includes a locking mechanism and may include a pretensioner. Exemplary locking mechanisms are described, for example, in U.S. Pat. No. 7,946,519 (which is incorporated by reference herein).

In general, the application discloses a seat belt retractor including a spool for winding and unwinding a seat belt webbing and a mechanism for absorbing energy resulting from an occupant's interaction with the belt webbing. The retractor includes a device for selectively cancelling the energy absorbing mechanism. The EA cancelling device may include a suitable structure for locking the spool in order to prevent rotation of the spool in the unwinding direction. Such structures include, for example, a gas generator that drives operation of a wedge, pawl or cinching band.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the retractors as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:
1. A seat belt system for protecting an occupant of a vehicle, the system comprising:
   a belt webbing connected to a seat belt retractor;
   wherein the retractor includes
      a frame;
      a spool configured to be fixed to one end of a webbing so that the webbing may be wound around the spool, the spool being rotatably mounted at both ends to the frame and configured to rotate in a webbing extraction direction and a webbing retraction direction;
      an energy absorbing device configured to absorb energy when the spool is rotated in the webbing extraction direction after an emergency event has occurred and operation of the energy absorbing device is triggered;

a mechanism for selectively cancelling the operation of the energy absorbing device by preventing motion of the spool in the webbing extraction direction, wherein the mechanism for cancelling the operation of the energy absorbing device is activated after the energy absorbing device is triggered.

2. The seat belt system of claim 1, wherein the mechanism for cancelling the operation of the energy absorbing device includes a pawl pivotably mounted on the frame, and wherein the pawl is configured to be driven to pivot into a position to engage the spool and prevent further movement of the spool in the webbing extraction direction.

3. The seat belt system of claim 1, further comprising:
a pre-tensioning device that provides tension to the seat belt webbing.

4. The seat belt system of claim 1, wherein the energy absorbing device comprises a torsion bar mounted onto the spool along a rotational axis of the spool, and wherein the torsion bar has one end free to rotate unless the free end is inhibited from rotating when the mechanism for cancelling the operation of the energy absorbing device is activated.

5. The seat belt system of claim 1, wherein the mechanism for cancelling the operation of the energy absorbing device includes a flexible band that wraps around at least a portion of the spool, and wherein the band is configured to be cinched around the spool to thereby prevent further rotation of the spool in the webbing extraction direction.

6. The seat belt system of claim 5, wherein the flexible band wraps around more than half of the spool.

7. The seat belt system of claim 1, wherein the retractor is positioned behind a vehicle seat.

8. The seat belt system of claim 7, wherein the seat belt system is positioned behind a front seat of a vehicle.

9. The seat belt system of claim 1, wherein the system further comprises:
a sensor to detect vehicle acceleration.

10. The seat belt system of claim 9, further comprising:
a controller for receiving signals from the sensor and for activating the mechanism for cancelling the operation of the energy absorbing device in response to the signals received from the sensor.

11. The seat belt system of claim 10, wherein the controller is configured to activate the mechanism for cancelling the operation of the energy absorbing device during a low offset impact event.

12. The seat belt system of claim 1, wherein the mechanism includes a wedge member that wedges in a position between the spool and the retractor frame to thereby prevent further movement of the spool in the webbing extracting direction.

13. The seat belt system of claim 12, wherein the wedge member wedges into a position between the spool and the retractor frame has teeth thereon, and the teeth engage with a flange on the spool.

14. The seat belt system of claim 12, wherein the mechanism for cancelling the operation of the energy absorbing device includes a pyrotechnic device for providing a force to drive the wedge member into the wedged position between the spool and the retractor frame.

15. The seat belt system of claim 12, wherein the wedge member forces the spool to engage the retractor frame to thereby prevent further movement of the spool in the webbing extraction direction.

16. The seat belt system of claim 12, wherein the wedge member is drawn along with rotation of the spool and wedges into a final position in a gap between the spool and the frame of the retractor.

17. The seat belt system of claim 16, wherein the spool has a flange thereon and wherein the frame of the retractor has teeth thereon, and wherein the spool flange is pushed into contact with the teeth of the retractor frame when the wedge member is in the final position in the gap between the spool and the frame of the retractor.

18. The seat belt system of claim 16, wherein the wedge member prevents rotation of the spool, thereby ceasing the operation of the energy absorption device when the wedge member is in the final position in the gap between the spool and the frame of the retractor.

19. A seat belt system for protecting an occupant of a vehicle, the system comprising:
a belt webbing connected to a seat belt retractor;
wherein the retractor includes
a frame;
a spool configured to be fixed to one end of a webbing so that the webbing may be wound around the spool, the spool being rotatably mounted at both ends to the frame and configured to rotate in a webbing extraction direction and a webbing retraction direction;
an energy absorbing device configured to absorb energy when the spool is rotated in the webbing extraction direction after an emergency event has occurred;
a mechanism for cancelling the operation of the energy absorbing device by preventing motion of the spool in the webbing extraction direction; and
wherein the energy absorbing device comprises a torsion bar mounted onto the spool, and wherein the mechanism prevents the torsion bar from twisting.

20. The seat belt system of claim 19, wherein the torsion bar is located along a rotational axis of the spool.

* * * * *